US012628037B2

(12) United States Patent
Höhne et al.

(10) Patent No.: US 12,628,037 B2
(45) Date of Patent: May 12, 2026

(54) NETWORK CODING WITH PACKET DATA CONVERGENCE PROTOCOL (PDCP) ENTITY

(71) Applicant: Nokia Technologies Oy, Espoo (FI)

(72) Inventors: Hans Thomas Höhne, Helsinki (FI); Kalle Petteri Kela, Kaarina (FI); Ling Yu, Kauniainen (FI); Ping-Heng Kuo, London (GB); Dawid Koziol, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 419 days.

(21) Appl. No.: 18/256,574

(22) PCT Filed: Dec. 10, 2020

(86) PCT No.: PCT/EP2020/085542
§ 371 (c)(1),
(2) Date: Jun. 8, 2023

(87) PCT Pub. No.: WO2022/122159
PCT Pub. Date: Jun. 16, 2022

(65) Prior Publication Data
US 2025/0024320 A1      Jan. 16, 2025

(51) Int. Cl.
*H04W 28/04*      (2009.01)
*H04L 1/00*      (2006.01)
*H04W 80/02*      (2009.01)

(52) U.S. Cl.
CPC ............ *H04W 28/04* (2013.01); *H04W 80/02* (2013.01)

(58) Field of Classification Search
CPC ...... H04W 28/04; H04W 80/02; H04L 1/0041
See application file for complete search history.

(56) References Cited

U.S. PATENT DOCUMENTS 12,224,860 B1 * 2/2025 Shattil ................... H04L 1/0077
2012/0281564 A1 11/2012 Zhang et al.
(Continued)

FOREIGN PATENT DOCUMENTS

WO      2015/067823 A1      5/2015
WO      2020/210682 A1      10/2020
WO      2022/073580 A1      4/2022

OTHER PUBLICATIONS

"3rd Generation Partnership Project; Technical Specification Group Radio Access Network; NR; Packet Data Convergence Protocol (PDCP) specification (Release 16)", 3GPP TS 38.323, V16.1.0, Jul. 2020, pp. 1-40.
(Continued)

*Primary Examiner* — Harry H Kim
(74) *Attorney, Agent, or Firm* — Carter, DeLuca & Farrell LLP

(57) ABSTRACT
Systems, methods, apparatuses, and computer program products for network coding are provided. One method may include receiving, at a second packet data convergence protocol (PDCP) entity, one or more original packet data convergence protocol (PDCP) protocol data units (PDUs) from a first PDCP entity for a radio bearer. The method may also include coding, at the second packet data convergence protocol (PDCP) entity, the original packet data convergence protocol (PDCP) protocol data units (PDUs) to produce one or more network coded packet data convergence protocol (PDCP) protocol data units (PDUs).

15 Claims, 12 Drawing Sheets

(56)                    References Cited

U.S. PATENT DOCUMENTS

| | | | |
|---|---|---|---|
| 2017/0041100 A1* | 2/2017 | Xie | H04L 1/0076 |
| 2017/0117987 A1* | 4/2017 | Park | H04L 1/0075 |
| 2019/0124572 A1* | 4/2019 | Park | H04L 69/04 |
| 2019/0174352 A1 | 6/2019 | Yi et al. | |
| 2019/0223256 A1 | 7/2019 | Lin et al. | |
| 2019/0357196 A1* | 11/2019 | Majmundar | H04L 49/3072 |
| 2020/0099481 A1 | 3/2020 | Pan et al. | |
| 2022/0173834 A1* | 6/2022 | Vidal | H04L 1/0076 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

Paris, Stefano, et al. "Addressing reliability needs of industrial applications in 5G NR with network coding." 2020 IEEE 91st Vehicular Technology Conference (VTC2020-Spring), May 2020, IEEE, pp. 1-6.

"Network coding for Release 17 IAB", 3GPP TSG RAN Meeting #84, R2-191346, Agenda: 8, Intel Corporation, Jun. 3-6, 2019, 8 pages.

"Discussion on the application of Network Coding for efficient PDCP Duplication with more than 2 copies", 3GPP TSG-RAN WG3 Meeting #105, R3-194503, Agenda: 17.2.3, China Unicom, Aug. 26-30, 2019, pp. 1-3.

"3rd Generation Partnership Project; Technical Specification Group Radio Access Network; NR; NR and NG-RAN Overall Description; Stage 2 (Release 16)", 3GPP TS 38.300, V16.2.0, Jul. 2020, pp. 1-148.

"Msc-generator", Sourceforge, Retrieved on Aug. 9, 2024, Webpage available at :https://sourceforge.net/projects/msc-generator/, 4 pages.

Centenaro, Marco, et al. "System-level study of data duplication enhancements for 5G downlink URLLC." IEEE Access 8, Dec. 2019, pp. 565-578.

International Search Report and Written Opinion received for corresponding Patent Cooperation Treaty Application No. PCT/EP2020/085542, dated Jun. 22, 2021, 12 pages.

"Use cases and options for network coding in IAB", 3GPP TSG RAN Meeting #86, RP-193077, Agenda: 9.1.2, Intel Corporation, Dec. 9-12, 2019 , 8 pages.

Communication pursuant to Article 94(3) EPC received for corresponding European Patent Application No. 20824517.5, dated Mar. 21, 2024, 4 pages.

Notice of Allowance received for corresponding European Patent Application No. 20824517.5, dated Oct. 8, 2024, 8 pages.

* cited by examiner

PDCP PDU header        payload

600

UE/NG-RAN/UE A

610

NG-RAN/UE/UE B

620

700

| Bit | Description |
|---|---|
| 000 | IP |
| 001 | Non-IP |
| 010 | coded PDU |
| 011-111 | Reserved |

| Bit | Description |
|---|---|
| 000 | PDCP status report |
| 001 | Interspersed ROHC feedback |
| 010 | EHC feedback |
| 011 | coded PDU |
| 100-111 | Reserved |

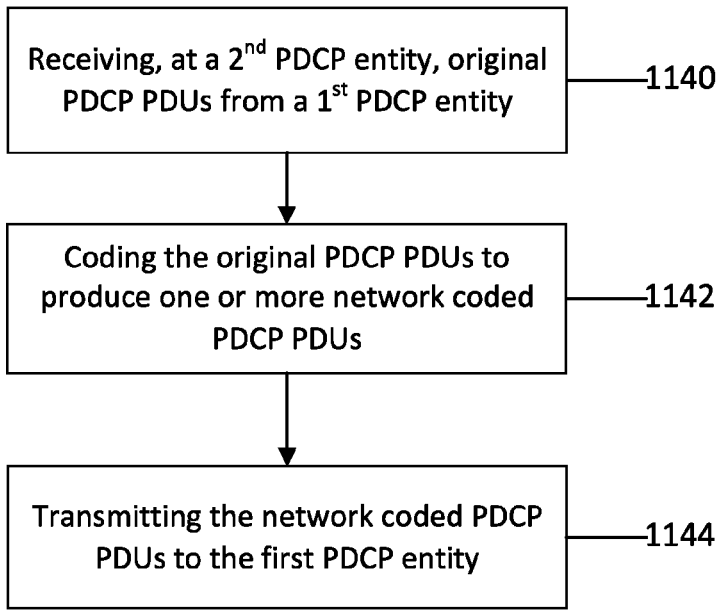

Receiving, at a 2nd PDCP entity, original PDCP PDUs from a 1st PDCP entity —1140

Coding the original PDCP PDUs to produce one or more network coded PDCP PDUs —1142

Transmitting the network coded PDCP PDUs to the first PDCP entity —1144

Fig. 14A

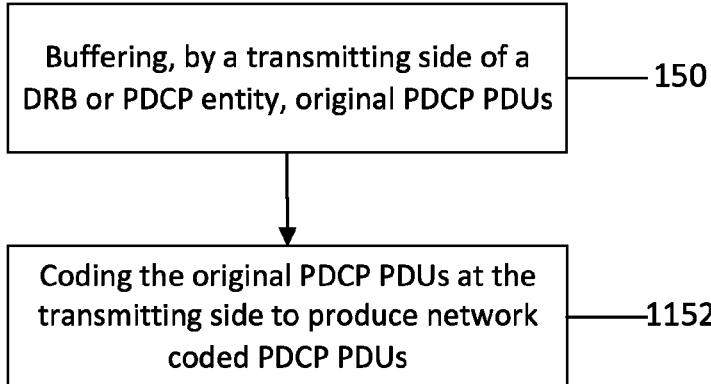

Buffering, by a transmitting side of a DRB or PDCP entity, original PDCP PDUs —150

Coding the original PDCP PDUs at the transmitting side to produce network coded PDCP PDUs —1152

Fig. 14B

NETWORK CODING WITH PACKET DATA CONVERGENCE PROTOCOL (PDCP) ENTITY

RELATED APPLICATION

This application was originally filed as PCT Application No. PCT/EP2020/085542, filed on Dec. 10, 2020, of which is incorporated herein by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for network coding.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

One embodiment may be directed to a method, which may include receiving, at a second packet data convergence protocol (PDCP) entity, one or more original packet data convergence protocol (PDCP) protocol data units (PDUs) from a first PDCP entity for a radio bearer. The method may also include coding, at the second packet data convergence protocol (PDCP) entity, the original packet data convergence protocol (PDCP) protocol data units (PDUs) to produce one or more network coded packet data convergence protocol (PDCP) protocol data units (PDUs).

In an example embodiment, the second packet data convergence protocol (PDCP) entity is configured to use its own sequence number (SN) space for the network coded packet data convergence protocol (PDCP) protocol data units (PDUs) or is configured to transmit network coded packet data convergence protocol (PDCP) protocol data units (PDUs) without sequence numbers (SNs).

According to one example embodiment, the method may further include transmitting the network coded packet data convergence protocol (PDCP) protocol data units (PDUs) to the first packet data convergence protocol (PDCP) entity.

In an example embodiment, when a plurality of coding methods are used to code the network coded packet data convergence protocol (PDCP) protocol data units (PDUs), a separate second packet data convergence protocol (PDCP) entity is provided for each of the coding methods used.

According to one example embodiment, the original packet data convergence protocol (PDCP) protocol data units (PDUs) are prioritized over the network coded packet data convergence protocol (PDCP) protocol data units (PDUs) in scheduling at the medium access control (MAC) layer, or the network coded packet data convergence protocol (PDCP) protocol data units (PDUs) are dropped entirely at the medium access control (MAC) layer.

In an example embodiment, the method may include receiving, at the second packet data convergence protocol (PDCP) entity, a RX_DELIV counter and, when the counter reaches a certain threshold, removing network coded packet data convergence protocol (PDCP) protocol data units (PDUs) from the buffer of the second packet data convergence protocol (PDCP) entity.

According to one example embodiment, the network coded packet data convergence protocol (PDCP) protocol data units (PDUs) carry at least one sequence number SN1 of an original packet data convergence protocol (PDCP) protocol data unit (PDU) used to code the network coded packet data convergence protocol (PDCP) protocol data units (PDUs).

In an example embodiment, another sequence number SN2 of the original packet data convergence protocol (PDCP) protocol data units (PDU) is derived by the following formula:

$$SN2 = SN1 + const1,$$

where the sequence numbers SN1 and SN2 are carried in the network coded packet data convergence protocol (PDCP) protocol data units (PDUs) headers, and const1 represents a first constant.

According to one example embodiment, the method may include linking original packet data convergence protocol (PDCP) protocol data units (PDUs) to network coded packet data convergence protocol (PDCP) protocol data units (PDUs) by a formula configured to derive the sequence number (SN) of the original packet data convergence protocol (PDCP) protocol data units (PDU) from the sequence number (SN) of the network coded packet data convergence protocol (PDCP) protocol data unit (PDU), such that the sequence number (SN) for the network coded packet data convergence protocol (PDCP) protocol data units (PDUs) is given by the following linking formula:

$$SN(1)_{PDCP1} = SN_{PDCP2} * n - const(1), \; SN(2)_{PDCP1} = SN_{PDCP2} * n - const(2),$$

$$\ldots, SN(n)_{PDCP1} = SN_{PDCP2} * n - const(n),$$

where n is the number of original packet data convergence protocol (PDCP) protocol data units (PDUs) used to create a network coded packet data convergence protocol (PDCP) protocol data unit (PDU), and const(n) represents a constant.

In an example embodiment, the method may include, when an error is detected in receipt of an original packet data convergence protocol (PDCP) protocol data unit (PDU), using the sequence number (SN) of the original packet data convergence protocol (PDCP) protocol data unit (PDU) and the linking formula to determine which original packet data convergence protocol (PDCP) protocol data units (PDUs) and network coded packet data convergence protocol (PDCP) protocol data units (PDUs) to use to reconstruct the missing original packet data convergence protocol (PDCP) protocol data unit (PDU).

Another embodiment may be directed to an apparatus including a first packet data convergence protocol (PDCP) entity for a radio bearer, the first packet data convergence protocol (PDCP) entity configured to carry one or more original packet data convergence protocol (PDCP) protocol data units (PDUs). The apparatus may also include a second packet data convergence protocol (PDCP) entity for the radio bearer, the second packet data convergence protocol (PDCP) entity configured to carry one or more network coded packet data convergence protocol (PDCP) protocol data units (PDUs). The second packet data convergence protocol (PDCP) entity is configured to receive one or more original packet data convergence protocol (PDCP) protocol data units (PDUs) from the first PDCP entity for a radio bearer, and code the original packet data convergence protocol (PDCP) protocol data units (PDUs) to produce one or more network coded packet data convergence protocol (PDCP) protocol data units (PDUs).

In one example embodiment, the second packet data convergence protocol (PDCP) entity is configured to use its own sequence number (SN) space for the network coded packet data convergence protocol (PDCP) protocol data units (PDUs) or is configured to transmit network coded packet data convergence protocol (PDCP) protocol data units (PDUs) without sequence numbers (SNs).

According to an example embodiment, the second packet data convergence protocol (PDCP) entity is configured to transmit the network coded packet data convergence protocol (PDCP) protocol data units (PDUs) to the first packet data convergence protocol (PDCP) entity.

In one example embodiment, when a plurality of coding methods are used to code the network coded packet data convergence protocol (PDCP) protocol data units (PDUs), the apparatus comprises a separate second packet data convergence protocol (PDCP) entity for each of the coding methods used.

According to an example embodiment, the original packet data convergence protocol (PDCP) protocol data units (PDUs) are prioritized over the network coded packet data convergence protocol (PDCP) protocol data units (PDUs) in scheduling at the medium access control (MAC) layer, or the network coded packet data convergence protocol (PDCP) protocol data units (PDUs) are dropped entirely at the medium access control (MAC) layer.

In an example embodiment, the second packet data convergence protocol (PDCP) entity is configured to receive a RX_DELIV counter and, when the counter reaches a certain threshold, to remove network coded packet data convergence protocol (PDCP) protocol data units (PDUs) from the buffer of the second packet data convergence protocol (PDCP) entity.

According to one example embodiment, the network coded packet data convergence protocol (PDCP) protocol data units (PDUs) carry at least one sequence number (SN1)

of an original packet data convergence protocol (PDCP) protocol data unit (PDU) used to code the network coded packet data convergence protocol (PDCP) protocol data units (PDUs).

In an example embodiment, another sequence number (SN2) of the original packet data convergence protocol (PDCP) protocol data units (PDU) is derived by the following formula:

$$SN2 = SN1 + const1,$$

where the sequence numbers SN1 and SN2 are carried in the network coded packet data convergence protocol (PDCP) protocol data units (PDUs) header, and const1 represents a first constant.

According to one example embodiment, the second packet data convergence protocol (PDCP) entity is configured to: link original packet data convergence protocol (PDCP) protocol data units (PDUs) to network coded packet data convergence protocol (PDCP) protocol data units (PDUs) by a formula configured to derive the sequence number (SN) of the original packet data convergence protocol (PDCP) protocol data units (PDU) from the sequence number (SN) of the network coded packet data convergence protocol (PDCP) protocol data unit (PDU), such that the sequence number (SN) for the network coded packet data convergence protocol (PDCP) protocol data units (PDUs) is given by the following linking formula:

$$SN(1)_{PDCP1} = SN_{PDCP2} * n - const(1), \ SN(2)_{PDCP1} = SN_{PDCP2} * n - const(2),$$

$$\dots, \ SN(n)_{PDCP1} = SN_{PDCP2} * n - const(n),$$

where n is the number of original packet data convergence protocol (PDCP) protocol data units (PDUs) used to create a network coded packet data convergence protocol (PDCP) protocol data unit (PDU), and const(n) represents a constant.

In an example embodiment, the second packet data convergence protocol (PDCP) entity is configured to: when an error is detected in receipt of an original packet data convergence protocol (PDCP) protocol data unit (PDU), using the sequence number (SN) of the original packet data convergence protocol (PDCP) protocol data unit (PDU) and the linking formula to determine which original packet data convergence protocol (PDCP) protocol data units (PDUs) and network coded packet data convergence protocol (PDCP) protocol data units (PDUs) to use to reconstruct the missing original packet data convergence protocol (PDCP) protocol data unit (PDU).

According to one example embodiment, the apparatus comprises at least one of a base station, gNB, user equipment, sidelink user equipment, or vehicle-to-everything device.

Another embodiment may be directed to an apparatus that includes means for receiving, at a second packet data convergence protocol (PDCP) entity, one or more original packet data convergence protocol (PDCP) protocol data units (PDUs) from a first PDCP entity for a radio bearer. The apparatus may also include means for coding, at the second packet data convergence protocol (PDCP) entity, the original packet data convergence protocol (PDCP) protocol data units (PDUs) to produce one or more network coded packet data convergence protocol (PDCP) protocol data units (PDUs).

Another embodiment may be directed to a method, which may include buffering, by a transmitting side of a data radio bearer (DRB) or packet data convergence protocol (PDCP) entity, original packet data convergence protocol (PDCP) protocol data units (PDUs). The method may also include coding the original packet data convergence protocol (PDCP) protocol data units (PDUs) at the transmitting side to produce network coded packet data convergence protocol (PDCP) protocol data units (PDUs).

In an example embodiment, the coded packet data convergence protocol (PDCP) protocol data units (PDUs) are given a sequence number (SN).

According to another example embodiment, the coded packet data convergence protocol (PDCP) protocol data units (PDUs) are not given a sequence number (SN).

In one example embodiment, the method may include demultiplexing the original packet data convergence protocol (PDCP) protocol data units (PDUs) and network coded packet data convergence protocol (PDCP) protocol data units (PDUs) at a receiving side of the data radio bearer (DRB) or packet data convergence protocol (PDCP) entity.

According to an example embodiment, the method may include repairing original packet data convergence protocol (PDCP) protocol data units (PDUs) and filtering out the network coded packet data convergence protocol (PDCP) protocol data units (PDUs).

In an example embodiment, the method may include linking the original packet data convergence protocol (PDCP) protocol data units (PDUs) to network coded packet data convergence protocol (PDCP) protocol data units (PDUs) by a formula configured to derive the sequence number (SN) of the original packet data convergence protocol (PDCP) protocol data unit (PDU) from the sequence number (SN) of the network coded packet data convergence protocol (PDCP) protocol data unit (PDU).

According to one example embodiment, the sequence number (SN) of an original packet data convergence protocol (PDCP) protocol data unit (PDU) is derived by the following formula:

$$SN_{original}(1) = SN_{coded} - const(1), \text{ and } SN_{original}(2) = SN_{coded} - const(2),$$

where coded sequence numbers (SNs) are those sequence numbers (SNs) for which (SN+const(3)) modulo 3=0.

In an example embodiment, the network coded packet data convergence protocol (PDCP) protocol data units (PDUs) carry at least one sequence number (SN1) of an original packet data convergence protocol (PDCP) protocol data unit (PDU) used to code the network coded packet data convergence protocol (PDCP) protocol data units (PDUs).

According to one example embodiment, another sequence number (SN2) of the original packet data convergence protocol (PDCP) protocol data units (PDU) is derived by the following formula:

$$SN2 = SN1 + const1,$$

where the sequence numbers SN1 and SN2 are carried in the network coded packet data convergence protocol (PDCP) protocol data units (PDUs) headers, and const1 represents a first constant.

In an example embodiment, the method may include delivering the original packet data convergence protocol (PDCP) protocol data units (PDUs) to higher layers even when network coded packet data convergence protocol (PDCP) protocol data units (PDUs) expected to arrive earlier have not yet arrived.

According to an example embodiment, the method may include including information in a header of the network coded packet data convergence protocol (PDCP) protocol data units (PDUs) that causes a user equipment (UE) to ignore the network coded packet data convergence protocol (PDCP) protocol data units (PDUs).

Another embodiment may be directed to an apparatus, which may include a data radio bearer (DRB) or packet data convergence protocol (PDCP) entity comprising a transmitting side and a receiving side. The transmitting side is configured to buffer original packet data convergence protocol (PDCP) protocol data units (PDUs), and to code the original packet data convergence protocol (PDCP) protocol data units (PDUs) to produce network coded packet data convergence protocol (PDCP) protocol data units (PDUs).

In an example embodiment, the coded packet data convergence protocol (PDCP) protocol data units (PDUs) are given a sequence number (SN).

According to one example embodiment, the coded packet data convergence protocol (PDCP) protocol data units (PDUs) are not given a sequence number (SN).

In an example embodiment, the receiving side of the data radio bearer (DRB) or packet data convergence protocol (PDCP) entity is configured to: demultiplex the original packet data convergence protocol (PDCP) protocol data units (PDUs) and network coded packet data convergence protocol (PDCP) protocol data units (PDUs).

According to one example embodiment, the receiving side of the data radio bearer (DRB) or packet data convergence protocol (PDCP) entity is configured to: repair original packet data convergence protocol (PDCP) protocol data units (PDUs) and filter out the network coded packet data convergence protocol (PDCP) protocol data units (PDUs).

In an example embodiment, the data radio bearer (DRB) or packet data convergence protocol (PDCP) entity is configured to: link the original packet data convergence protocol (PDCP) protocol data units (PDUs) to network coded packet data convergence protocol (PDCP) protocol data units (PDUs) by a formula configured to derive the sequence number (SN) of the original packet data convergence protocol (PDCP) protocol data unit (PDU) from the sequence number (SN) of the network coded packet data convergence protocol (PDCP) protocol data unit (PDU).

According to one example embodiment, the sequence number (SN) of an original packet data convergence protocol (PDCP) protocol data unit (PDU) is derived by the following formula:

$$SN_{original}(1) = SN_{coded} - const(1), \text{ and } SN_{original}(2) = SN_{coded} - const(2),$$

where coded sequence numbers (SNs) are those sequence numbers (SNs) for which (SN+const(3)) modulo 3=0.

In an example embodiment, the network coded packet data convergence protocol (PDCP) protocol data units (PDUs) carry at least one sequence number (SN1) of an original packet data convergence protocol (PDCP) protocol data unit (PDU) used to code the network coded packet data convergence protocol (PDCP) protocol data units (PDUs).

According to an example embodiment, another sequence number (SN2) of the original packet data convergence protocol (PDCP) protocol data units (PDU) is derived by the following formula:

$$SN2 = SN1 + const1,$$

where the sequence numbers SN1 and SN2 are carried in the network coded packet data convergence protocol (PDCP) protocol data units (PDUs) headers, and const1 represents a first constant.

In an example embodiment, the data radio bearer (DRB) or packet data convergence protocol (PDCP) entity is configured to: deliver the original packet data convergence protocol (PDCP) protocol data units (PDUs) to higher layers even when network coded packet data convergence protocol (PDCP) protocol data units (PDUs) expected to arrive earlier have not yet arrived.

According to an example embodiment, the data radio bearer (DRB) or packet data convergence protocol (PDCP) entity is configured to: include information in a header of the network coded packet data convergence protocol (PDCP) protocol data units (PDUs) that causes a user equipment (UE) to ignore the network coded packet data convergence protocol (PDCP) protocol data units (PDUs).

Another embodiment may be directed to an apparatus, which may include means for buffering, by a transmitting side of a data radio bearer (DRB) or packet data convergence protocol (PDCP) entity, original packet data convergence protocol (PDCP) protocol data units (PDUs). The apparatus may also include means for coding the original packet data convergence protocol (PDCP) protocol data units (PDUs) at the transmitting side to produce network coded packet data convergence protocol (PDCP) protocol data units (PDUs).

BRIEF DESCRIPTION OF THE DRAWINGS

For proper understanding of example embodiments, reference should be made to the accompanying drawings, wherein:

FIG. 14A illustrates an example flow diagram of a method, according to an embodiment;

FIG. 14B illustrates an example flow diagram of a method, according to an embodiment;

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for network coding, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Network coding takes advantage of coding gain from combining at least two packets in a data flow and transmitting a packet comprising the coded version of the two or more packets. At the receiver side, the coded packet can be used to retrieve original packets which were unsuccessfully received or which were not sent at all (some coding techniques allow for retrieval original packets using just coded packets). In order to retrieve the original packets, the receiver is not required to successfully receive all of the packets (either original or coded ones) as the decoding operation can be successful when only a subset of the transmitted packets is received. As a result, network coding may provide a transmission reliability comparable to that of packet duplication, but with higher radio resources utilization efficiency or higher transmission reliability with the same resource utilization. Some of the more popular coding techniques applicable in network coding may include, for example, XOR coding or Reed-Solomon coding.

Figure 1:
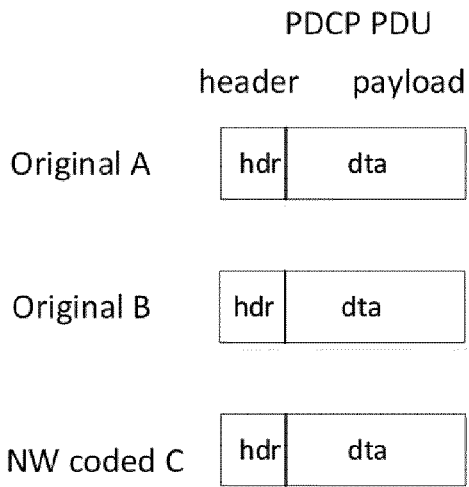
FIG. 1 illustrates an example of original and coded packets or protocol data units (PDUs) for PDCP layer network coding, according to an embodiment.

FIG. 1 illustrates an example of original and coded packets or protocol data units (PDUs) for PDCP layer network coding, according to an embodiment. Different variants for creating the network coded PDU C can be envisioned, for example: dta C=(hdr_A, dta_A)+(hdr_B, dta_B), or dta C=(dta_A)+(dta_B), where "+" denotes the network coding operation, dta C is the payload of the network coded PDU C, dta A is the payload of original PDU A, dta B is the payload of original PDU B, hdr A is the header of original PDU A, and hdr B is the header of original PDU B.

Figure 2:
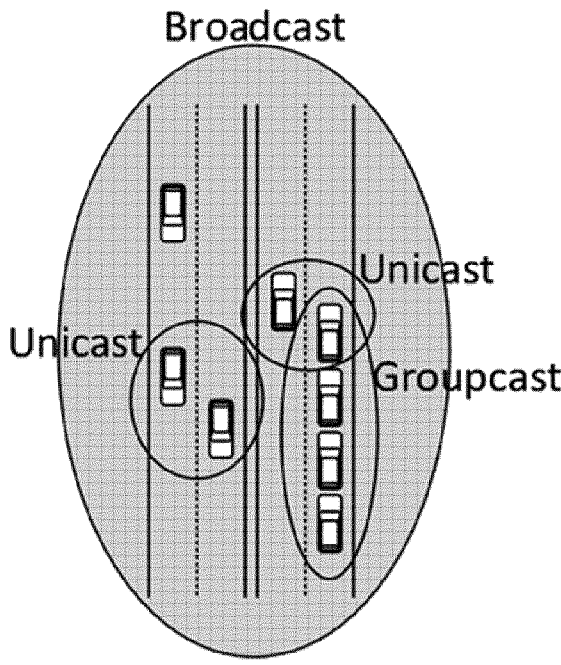
FIG. 2 illustrates examples for device-to-device (D2D) communication.

Network coding may also be applied to vehicle-to-everything (V2X) scenarios, where network coded packets can increase the reliability for users in bad channel conditions. For 4G-LTE and 5G-NR sidelink (SL) specifies device to device (D2D) communication. D2D includes relay operation, where UE acts as a relay node. FIG. 2 illustrates examples for D2D. In particular, FIG. 2 illustrates the options of unicast, groupcast and broadcast for D2D. Unicast refers to transmission (Tx)/reception (Rx) of user data between a pair of UEs, groupcast refers to Tx/Rx of user data within a group of UEs, and broadcast refers to Tx/Rx of user data among each of the UEs using SL.

Therefore, as will be described in detail herein, certain embodiments may be directed to 3GPP devices (e.g., UEs and gNBs) deploying network coding in general and in V2X devices as one example, where network coded packets can increase the reliability for users in bad channel conditions. Some example embodiments may consider network coding for PDCP PDUs, and groupcast and/or broadcast transmission. As such, example embodiments provide an approach for allowing network coding to be part of the PDCP layer.

When a receiver obtains a network coded PDU, it needs to know which are the underlying original PDUs. This can be done by including a new information element that is listing the contained original PDUs thereby generating a new type of PDCP PDU, or by suitable trivial numbering schemes, such as generating a network coded PDU following immediately the original PDUs. Trivial numbering schemes have the disadvantage that they are not able to exploit, e.g., time diversity by flexible arrangement of transmission of original and coded PDUs.

Additionally, when network coding is integrated into the PDCP layer, it is preferable that the network coded PDUs should not delay delivery of the original PDUs to higher layers; this would occur when coded PDUs receive a sequence number (SN), and coded PDUs are delayed, and reordering functionality is not modified. Thus, improvements are needed for the PDCP reordering and delivery process.

Certain example embodiments provide an architecture configured for coding within the PDCP sublayer, which could be considered implementation specific. For example, one embodiment may provide a dual PDCP entity, where original and coded packets use separate PDCP entities. Another embodiment may provide a single data radio bearer (DRB) or PDCP entity, where original and coded packets use the same DRB or PDCP entity. Additionally, further example embodiments can provide a numbering scheme configured for linking the original PDUs to coded PDUs.

Figure 3:
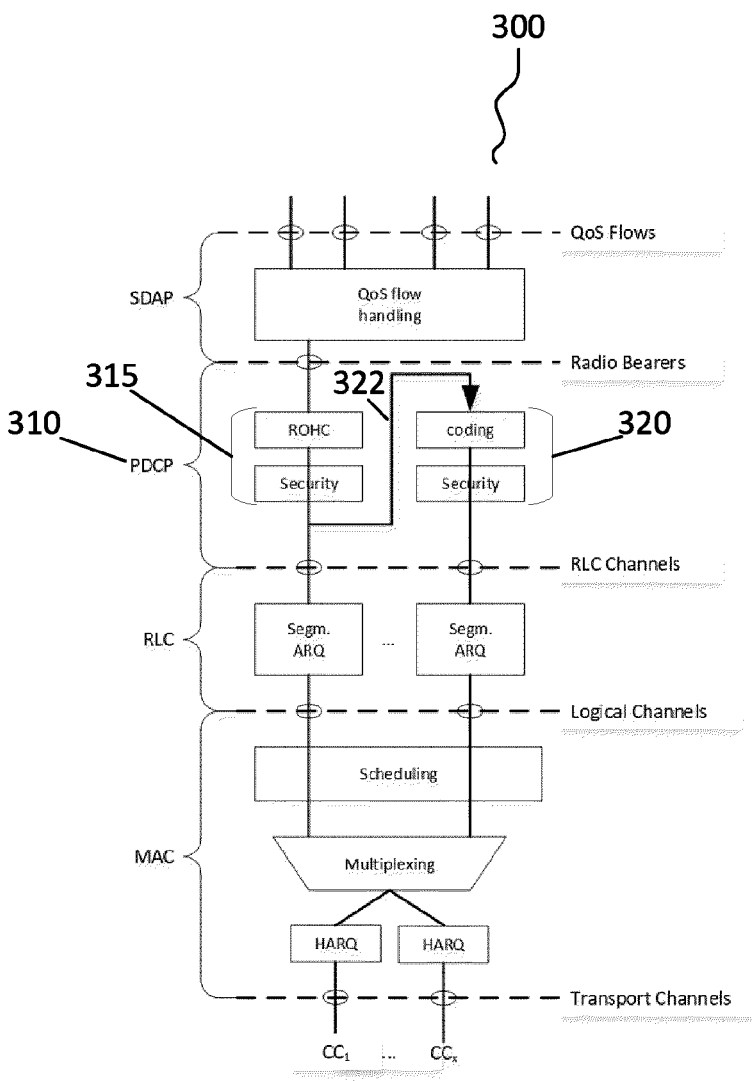
FIG. 3 illustrates an example diagram of a dual PDCP entity, according to an embodiment.

An example embodiment provides a dedicated PDCP entity for a radio bearer, such as a DRB or, for sidelink, a SLRB. This dedicated PDCP entity may be configured to carry network coded PDCP PDUs, in addition to a PDCP entity that is configured to carry original traffic. FIG. 3 illustrates an example diagram 300 of a dual PDCP entity 310, according to an embodiment. As illustrated in the example of FIG. 3, the dual PDCP entity 310 may include a new dedicated PDCP entity 320, which does not take or deliver data to or from higher layers, but takes data to or from the associated PDCP entity 315 responsible for transmitting or receiving the original PDCP PDUs. This allows, for example, prioritizing original packets over coded packets in scheduling at MAC layer. It should be noted that if multiple coding methods are used, such as XOR or Reed-Solomon, then it is also possible to have a separate PDCP entity for each coding method.

Figure 4:
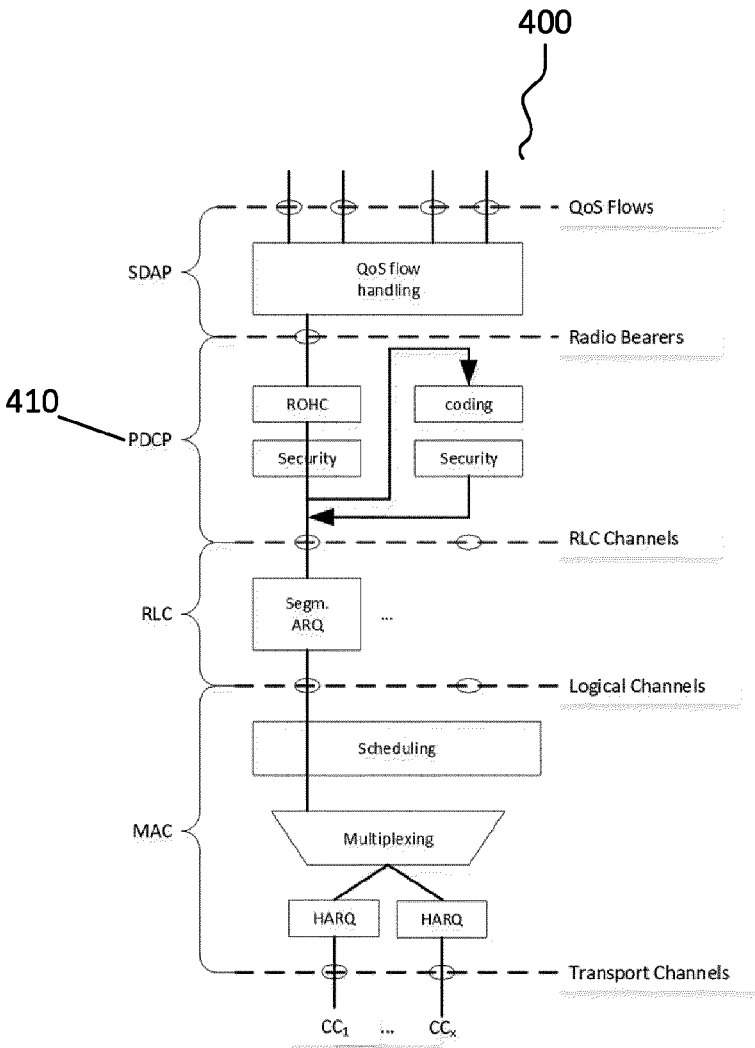
FIG. 4 illustrates an example diagram of a single PDCP entity, according to an embodiment.

Alternatively or additionally, an example embodiment provides a single DRB or single PDCP entity that is configured to carry both the original and network coded PDCP PDUs. FIG. 4 illustrates an example diagram 400 of a single PDCP entity 410, according to an embodiment.

According to certain embodiments, the original PDUs may be linked to the network coded PDUs via a formula that allows to derive the original PDU SN from the network coded PDU SN. Corresponding functionality is introduced into the PDCP entity. In an embodiment, the formula allows to introduce a SN offset between original and coded PDUs. In an embodiment, the network coded PDU does not have its own SN, but holds one original PDU SN, and the other original PDU SN can be derived via a formula, for example.

In some embodiments, the PDCP entity delivery functionality may be modified to skip network coded PDUs in delivery. According to an embodiment, in the case of a single DRB/PDCP entity solution, original PDUs may be delivered (in ordered fashion) to higher layers before network coded PDUs have arrived to the PDCP entity.

Figure 5:
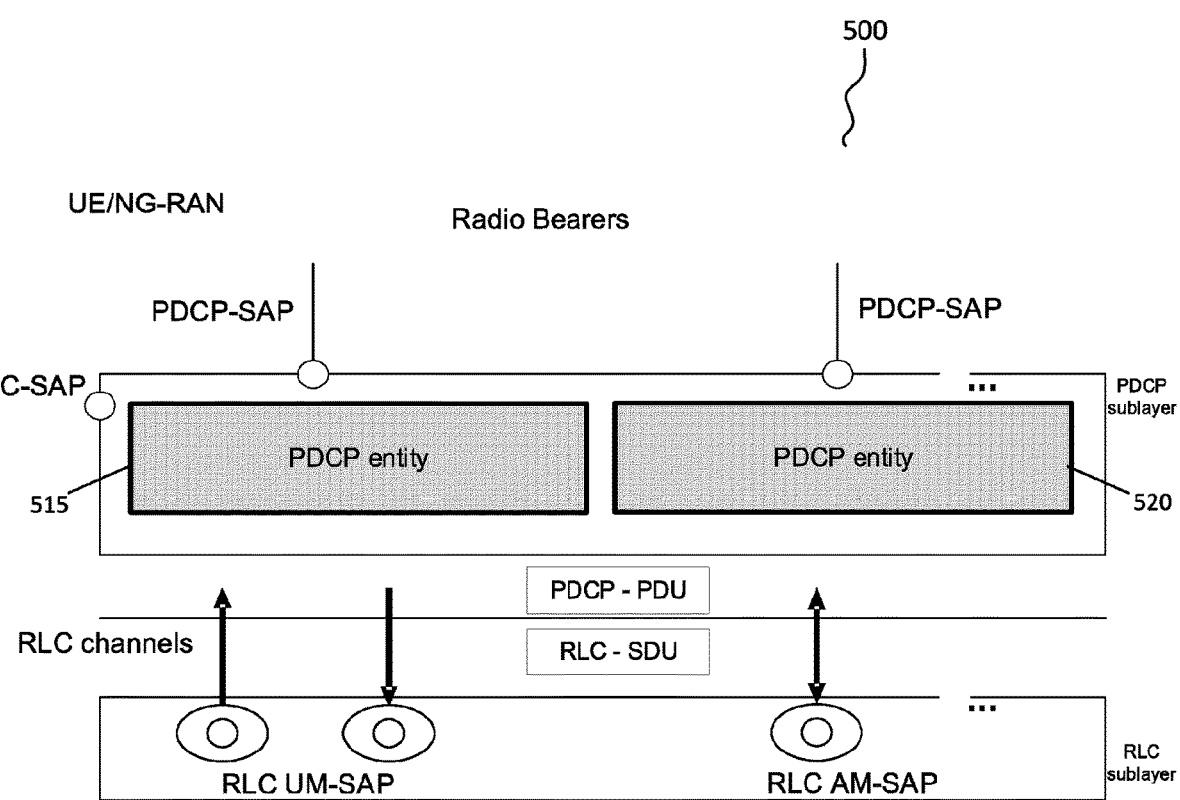
FIG. 5 illustrates an example PDCP sublayer, according to certain embodiments.

FIG. 5 illustrates an example PDCP sublayer 500, according to certain embodiments. As illustrated in the example of FIG. 5, the PDCP sublayer 500 may hold several PDCP entities 515, 520. One DRB may be associated with one PDCP entity and vice versa. Hence, in the following, a DRB entity or PDCP entity may be referred to alternatively.

Further, the SN number carried in the header of a PDCP PDU is just part of its actual counter. The complete counter, e.g., at the receiver may be according to the following: RCVD_COUNT=[RCVD_HFN, RCVD_SN], where RCVD_HFN is a counter maintained both in the transmitter and receiver, and RCVD_SN is the SN found in the PDCP PDU header which was received. In the following, for purposes of simplicity, the RCVD_COUNT may refer to SN or PDCP SN and likewise for the transmitter.

It is noted that, when applying networking coding using PDCP PDUs, the related functionality may be integrated into one or two PDCP entities, such that lower and higher layers may not be aware.

As introduced above, FIG. 3 illustrates an example 300 of network coding according to a dual PDCP 310 using two PDCP entities 315, 320. In an embodiment, the coded PDUs may be sent via the second PDCP entity 320. According to certain embodiments, the second PDCP entity 320 may either use its own SN space or it may send un-numbered PDCP PDUs, which carry information as to which original PDUs are being encoded. In one embodiment, the dual PDCP's second entity 320 is configured to take its input data 322 from the first PDCP entity 315, as illustrated in the example of FIG. 3.

As illustrated in the example of FIG. 3, the fact that the second PDCP entity 320 contains just coded data means that its data is not delivered by higher layers, like for a normal PDCP entity connected to a normal DRB. Likewise, at the receive side, unlike PDCP entities of normal DRBs, there is no payload data that needs to be delivered to higher layers. This approach may also yield separate logical channels, which can be further subjected to differing prioritization in scheduling. For example, if a MAC scheduler is lacking of physical resources or reliability boost from coded packets is not momentarily needed, the MAC scheduler may prioritize easily DRB carrying original packets over coded packets or drop entirely coded packets, if required.

Figure 6:
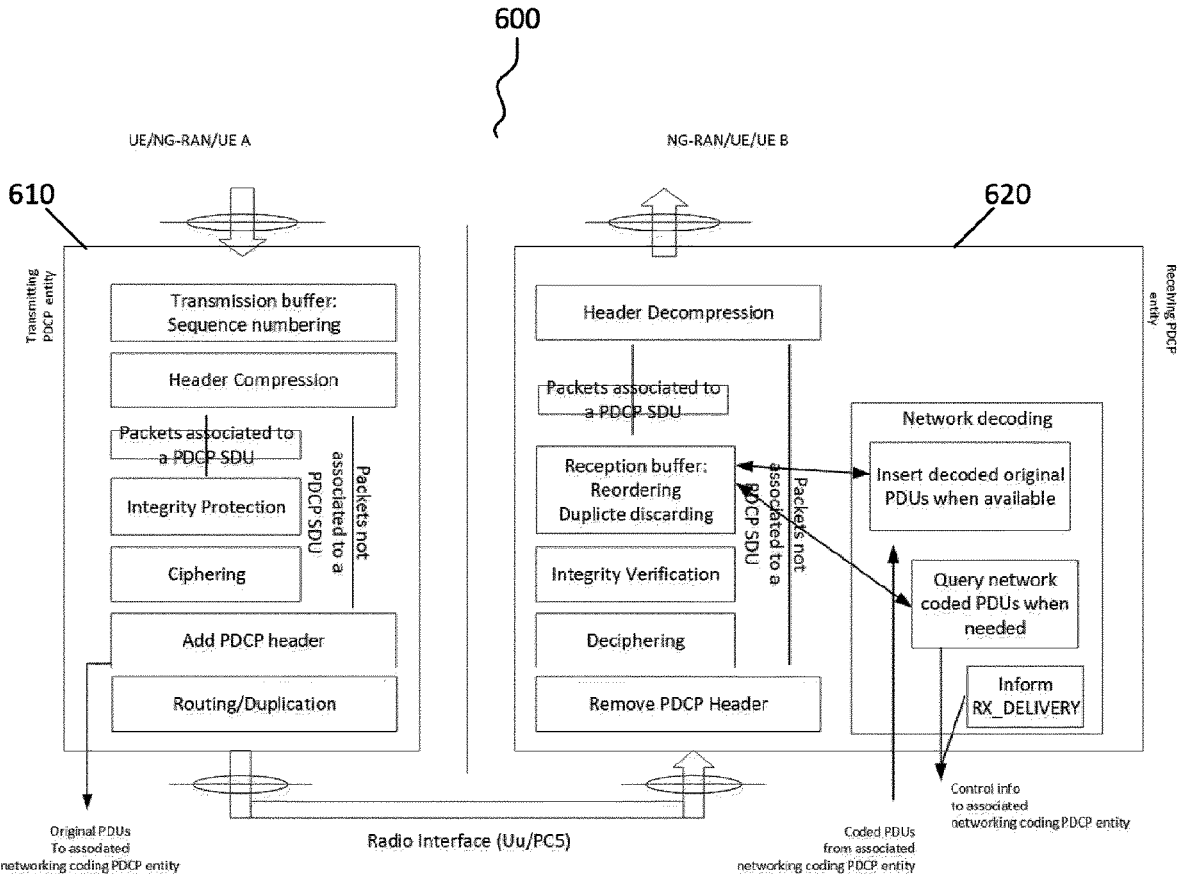
FIG. 6 illustrates a functional flow for a PDCP entity that handles original PDUs when network coding is enabled, according to an example embodiment.
Figure 7:
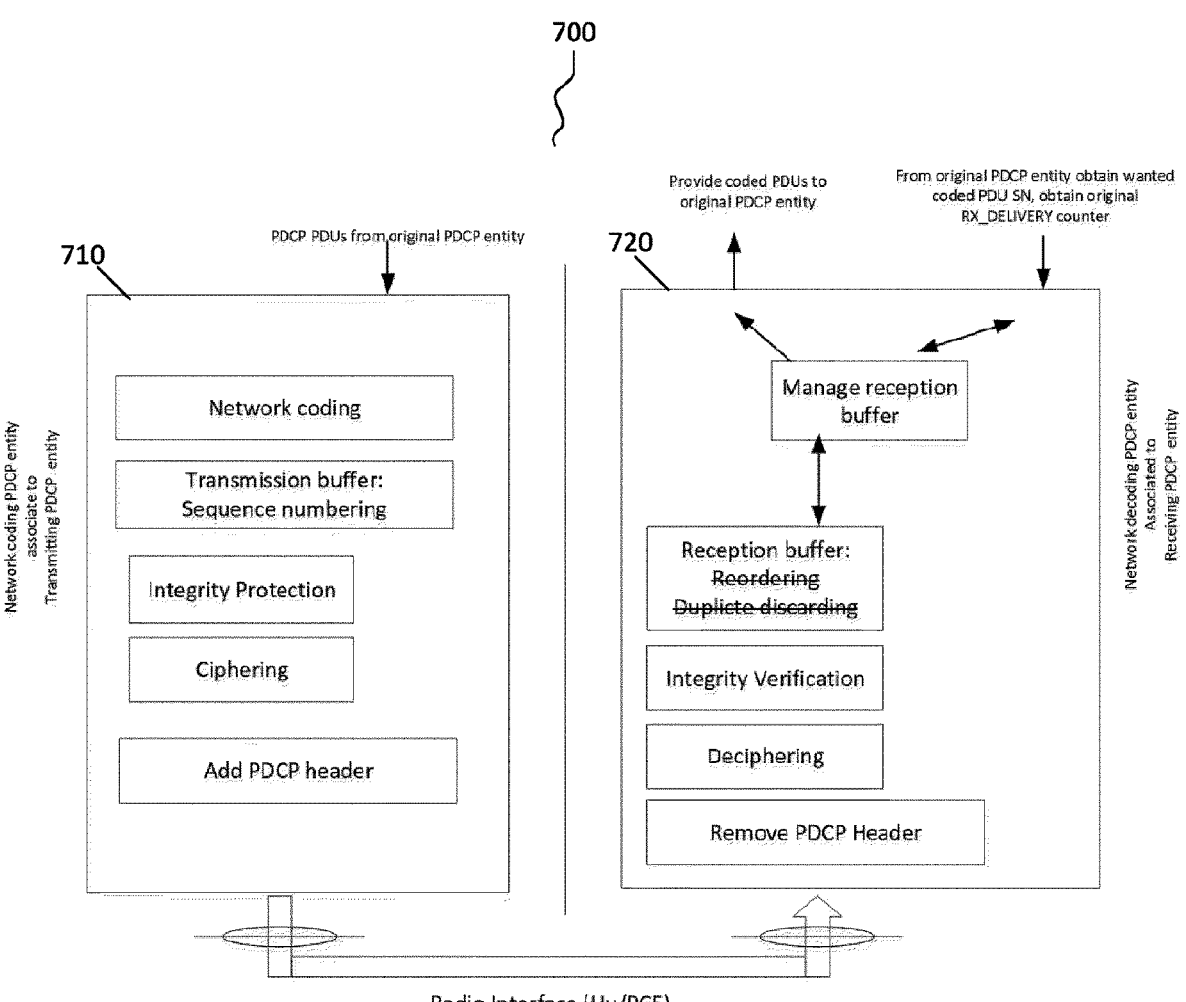
FIG. 7 illustrates a functional flow for network coding PDCP associated with an original PDCP entity, according to one example embodiment.

FIG. 6 and FIG. 7 illustrate a more detailed view of a possible functional flow and the interaction between the two receive PDCP entities 620, 720, according to an example embodiment. For example, FIG. 6 illustrates a functional flow for a PDCP entity 600 that handles original PDUs when network coding is enabled, according to an example embodiment. As illustrated in the example of FIG. 6, a transmitting side of the PDCP entity 610 may transmit original PDUs to an associated network coding PDCP entity, and a receiving side of the PDCP entity 620 may receive coded PDUs from an associated network coding PDCP entity.

FIG. 7 illustrates a functional flow for network coding PDCP 700 associated with an original PDCP entity, such as the PDCP entity 600 of FIG. 6, according to one example embodiment. As illustrated in the example of FIG. 7, the network coding PDCP 700 includes a network coding PDCP entity 710 associated with a transmitting PDCP entity, such as the transmitting side of the PDCP entity 610 in FIG. 6. As further illustrated in the example of FIG. 7, the network coding PDCP 700 may also include a network coding PDCP entity 720 associated with a receiving PDCP entity, such as the receiving side of the PDCP entity 620 in FIG. 6. In an embodiment, the receiving PDCP entity 620 may communicate with the network decoding PDCP entity 720 by primitives such as request coded PDU (SN) and inform RX_DELIVERY counter. Similarly, in an embodiment, the network decoding PDCP entity 720 may perform the network decoding in which case the primitives may include provide original PDUs and inform RX_DELIVERY. It is noted that informing of the PDCP internal counter RX_DELIVERY serves the purpose of clearing coded PDUs from the buffer when they are no longer needed. For example, when the RX_DELIVERY counter reaches a certain threshold, then the corresponding coded PDUs may be removed from the buffer.

Figure 8:
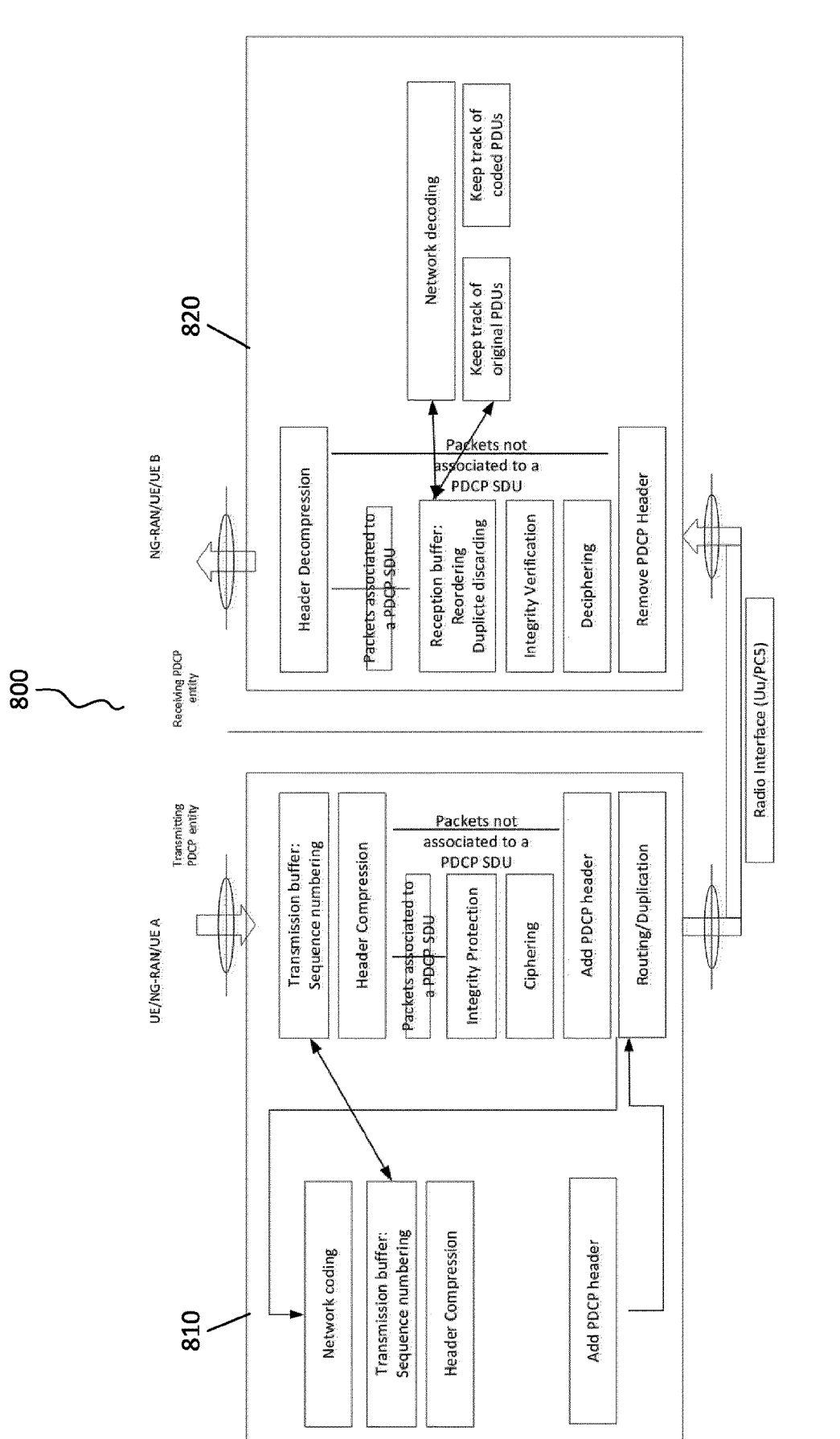
FIG. 8 illustrates an example of the functional flow network coding using a single PDCP entity, according to an embodiment.

As introduced above, FIG. 4 illustrates an example 400 of PDCP sublayer network coding with a single DRB or PDCP entity 410. In the example of FIG. 4, the PDCP layer can take care of network coding functions using a single DRB. FIG. 8 illustrates an example of the functional flow 800 network coding using a single PDCP entity, according to an embodiment. As illustrated in the example of FIG. 8, on the transmitting side 810, the transmitter may buffer original PDUs such that coded PDUs can be created (for example from consecutive PDUs that arrive for transmission). On the receiving side 820, coded and original PDUs may be demultiplexed. In an embodiment, the handling of the reception buffer and reordering and delivery function may be modified to repair original PDUs, and filter out the coded PDUs. We note that "repair" may be used here and elsewhere in this disclosure as a synonym for "decode" and/or "reconstruct", in the sense that a missing or faulty original PDU can be retrieved by the network decoding process.

As discussed above, certain example embodiments may provide a method for linking of original and coded PDUs. One embodiment may insert PDCP PDUs which have a different type than normal PDUs, and do not carry a SN. This will avoid the situation where legacy UEs attempt decoding the coded PDUs (e.g., in groupcast). Further, this embodiment can keep modifications to the re-ordering and delivery functionality small. A coded PDU, however, needs to carry at least one SN of an original PDU. The other original SN that were used can be derived by a formula. An example for a non-trivial linking is PDU_coded=PDU_original(SN)+ PDU_original(SN+const1), where the SN is carried in the coded PDU. This approach works for both the dual and single DRB/PDCP architectures discussed above. In other words, in this example, the PDU_coded would be derived from two original PDUs, PDU_original(SN) and PDU_ original(SN+const1). SN may be labeled as SN1, and SN+const1 may be labeled as SN2. Thus, when a coded PDU has been received and it contains an SN1 identifying an original PDU, also the SN2 identifying the other original PDU can be derived in this example according to the formula SN2=SN1+const1.

Figure 9A:
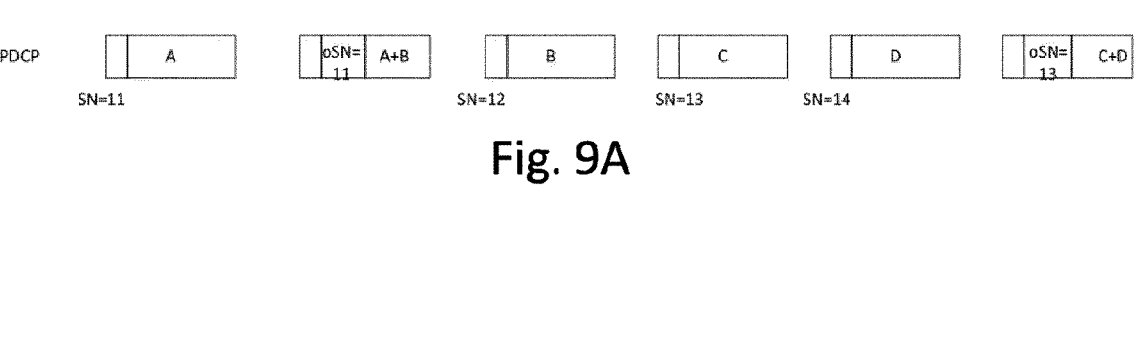
FIG. 9A illustrates an example where coded PDU do not have their own SN, according to an embodiment.

FIG. 9A illustrates an example in which the coded PDU do not have their own SN, but contain the SN of an original PDU in their payload. The coded PDU holds in its payload the original PDU SN, which is designated in FIG. 9A as oSN. In the example of FIG. 9A, const1=1 (and hence SN1=11, SN2=12). It is noted that here the coded PDUs may appear out-of-order with respect to the original PDUs.

Figure 9B:
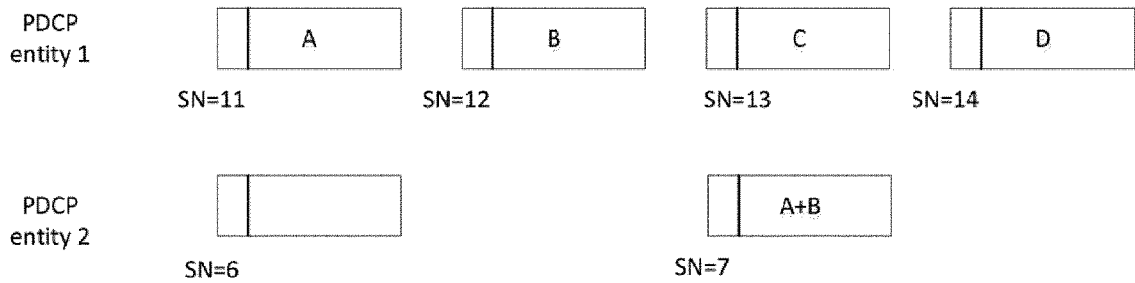
FIG. 9B illustrates an example of linking the original to network coded PDUs via the PDCP SN, according to an embodiment.

FIG. 9B illustrates an example of linking the original to network coded PDUs via the PDCP SN, according to an embodiment. As described herein, for purposes of simplicity, PDCP entity 1 may be referred to as the first PDCP entity or PDCP1, and PDCP entity 2 may be referred to as the second PDCP entity or PDCP2. As illustrated in the example of FIG. 9B, the PDCP SN of the second PDCP entity (PDCP2) may be linked to the first PDCP entity (PDCP1). In the example of FIG. 9B, two PDCP1 PDUs may be used to generate one PDCP2 PDU. Hence, PDCP2 SNs can be linked to PDCP1 SNs as follows:

$$SN(1)PDCP1=SN_{PDCP2}*2-3, \quad \text{and}$$
$$SN(2)_{PDCP1}=SN_{PDCP2}*2-2,$$

or more generally as:

$$SN(2)_{PDCP1} = SN_{PDCP2} * 2 - const(1),$$
$$\text{and } SN(2)_{PDCP1} = SN_{PDCP2} * 2 - const(2).$$

The above-noted example is for creating a coded PDU using two original PDUs. If n original PDUs are used to create a coded PDU the general form for the SN for the coded PDU may be given as follows:

$$SN(1)_{PDCP1} = SN_{PDCP2} * n - const(1), \ SN(2)_{PDCP1} = SN_{PDCP2} * n - const(2),$$
$$\dots, SN(n)_{PDCP1} = SN_{PDCP2} * n - const(n).$$

It is noted that an advantage of the above-described linking of original and coded PDUs is that no additional overhead is incurred.

Figure 10:
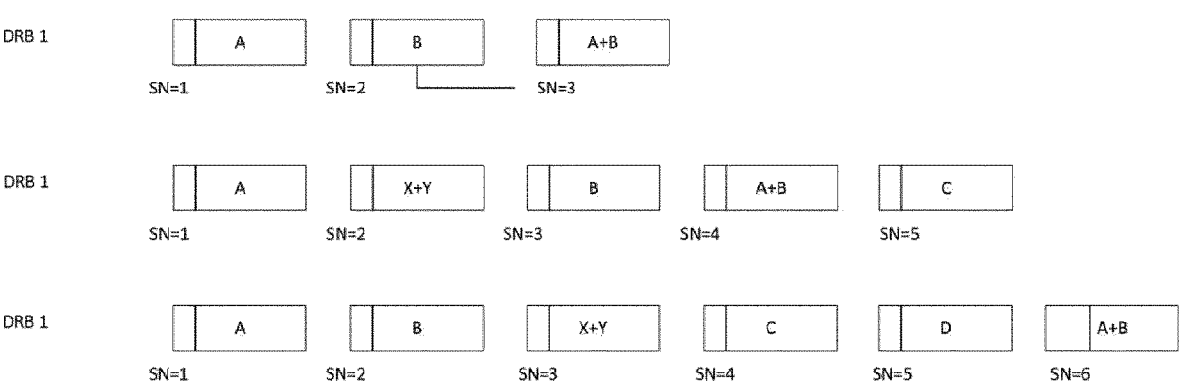
FIG. 10 illustrates an example of linking the original to network coded PDUs with SN in an embodiment with a single PDCP entity, according to an embodiment.

FIG. 10 illustrates an example of linking the original to network coded PDUs with SN in an embodiment with a single PDCP entity, according to an embodiment. In the example of FIG. 10, different variants for the linking of original to coded PDUs are shown (each line showing different variant), with the first line showing the trivial solution. According to an embodiment, in order to determine from a SN whether the PDU is coded or not, the start of the series is configured, e.g., in the trivial solution by informing "all SNs, for which SN modulo 3=0 are coded PDUs".

In the example of FIG. 10, the second and third line respectively have:

$2^{nd}$ line example: $SN_{original}(1)=SN_{coded}-3$, and $SN_{original}(2)=SN_{coded}-1$, where coded SNs are those SNs for which (SN+2) modulo 3=0

$3^{rd}$ line example: $SN_{original}(1)=SN_{coded}-5$, and $SN_{original}(2)=SN_{coded}-4$, where coded SNs are those SNs for which SN modulo 3=0, or more generally as:

$SN_{original}(1)=SN_{coded}-const(1)$, and $SN_{original}(2)=SN_{coded}-const(2)$, where coded SNs are those SNs for which (SN+const(3)) modulo 3=0.

In certain embodiments, when using more than two PDUs for generating the coded PDU, then the methods may be extended in analogous fashion. For instance, when using three original PDUs to create one coded PDU, the coded PDU SNs could be set to satisfy (SN+const) modulo 4=0.

An advantage of the latter numbering schemes using an offset is that more time diversity can be introduced between original and coded PDU, and for some offsets the transmitter is given more time to produce a coded version of the original PDUs.

According to an example embodiment, for a single PDCP entity receiving original and network coded PDUs interleaved in SN space, the entity does not delay delivering original PDUs to higher layers when network coded PDUs that should have come earlier have not yet arrived. This is not the same as configuring an "outOfOrderDelivery", as the original PDUs among themselves are still delivered in order.

Legacy UEs receiving this type of data may be confused by this scheme. Beyond not being able to make use of the network coded PDCP PDUs data, these UEs will also deliver the coded PDCP PDUs to higher layers, which will lead to unexpected application layer behaviour. To avoid this problem, an embodiment may be configured to carry information in the PDU header that causes such legacy UEs to ignore the PDU. Nevertheless, the PDCP SN space may be continuous across the coded and uncoded PDUs.

Figure 11:
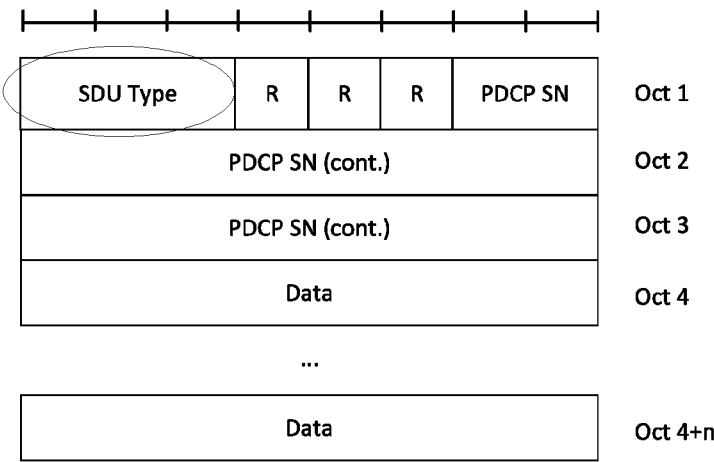
FIG. 11 illustrates an example of a new SDU type, according to an embodiment.
Figure 12:
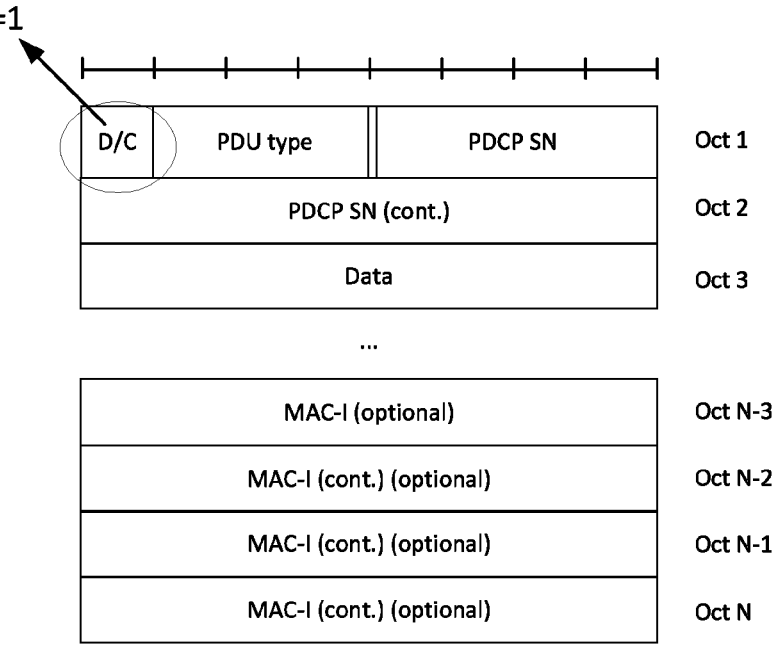
FIG. 12 illustrates an example of a new PDU type, according to an embodiment.

According to certain embodiments, several options may be provided for configuring the PDU head to carry information that causes legacy UEs to ignore a coded PDU. As illustrated in the example of FIG. 11, for a data PDU for SLRBs, a new SDU type may be used. As illustrated in the example of FIG. 12, for non-SL, a new PDU type can be created by declaring the PDU a control PDU, setting the type to a new "coded PDU", and defining a new PDU format that corresponds to a data PDU.

Some example embodiments may provide for a receiver PDCP reordering modification when coded PDUs are given their own PDCP SN. Normal PDCP receiver operation involves a reordering buffer, which delivers PDCP PDUs in ordered sequence to higher layers. In 5G-NR, a timer t-Reordering may be configured, or outOfOrderDelivery may be configured. The reordering function does not consider coded PDUs when deciding to deliver original PDUs to higher layers. When coded PDUs do not carry a SN this problem is avoided.

Figure 13:
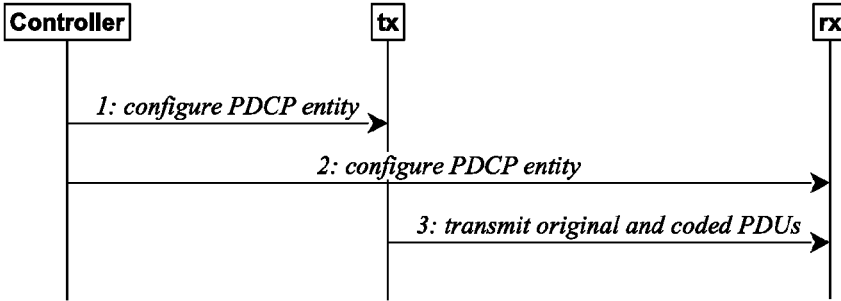
FIG. 13 illustrates an example signaling diagram for configuring a transmitter and receiver, according to certain example embodiments.

FIG. 13 illustrates an example signaling diagram for configuring a transmitter and receiver, according to certain example embodiments. As illustrated in the example of FIG. 13, the transmitter and receiver may be provided, at 1 and 2 respectively, with a configuration of network coding functionality in PDCP entity. The configuration may include the DRB to use if any, lower layer (RLC, MAC) configuration if second PDCP entity is used, and/or formula to link the original to coded PDUs. Depending on the solution, the formula may be expressed by (const(1), const(2)), or (n, const(1) . . . const(n)), as discussed above.

For instance, according to the example of FIG. 13, the receiver may obtain, at 2, the configuration with coded PDU SN mapping to original PDU SN and/or DRB/PDCP configuration (single or dual). In case of error in the original PDCP PDU, the receiver may use SN of original PDU and the linking formula to determine which original and coded PDUs to use to reconstruct the missing original. When the receiver's RX_DELIV pointer has advanced to a certain threshold, it may remove corresponding coded PDUs in its buffer. In an embodiment, the receiver does not deliver coded PDUs to higher layers.

In an embodiment, the transmitter may receive information on how to map network coded PDUs to original SN. There may be single or dual DRB, and a second "special" DRB/PDCP entity may be configured if needed. According to certain embodiments, the transmitter may be a gNB, or UE sending groupcast, or relay UE sending network coded traffic.

In some embodiments, if legacy UEs are present in groupcast, then those transmitters which send coded PDUs (that is also network coding relays) may be configured to set a reserved bit in the PDCP header for coded PDUs. This will cause legacy UEs to discard the coded PDUs. In case coded PDU with SN are used, legacy UEs may be configured with out-of-order-delivery, or short t-Reordering, to avoid delays because of discarded coded PDUs.

As further illustrated in the example of FIG. 13, at 3, the transmitter may send original PDCP PDUs, which is optional for relay UEs, and may also send coded PDCP PDU using SN as described above.

FIG. 14A illustrates an example flow chart of a method for network coding of packets using a dual DRB/PDCP entity, according to one embodiment. In certain example embodiments, the flow diagram of FIG. 14A may be performed by a network entity or network node in a communications system, such as LTE or 5G NR. In some example embodiments, the network entity performing the method of FIG. 14A may include or be included in a base station, access node, node B, eNB, gNB, NG RAN node, or the like. In other example embodiments, the network entity performing the method of FIG. 14A may include or be included in a UE, SL UE, relay UE, mobile station, mobile device, IoT device or sensor, or the like. For instance, in one example embodiment, the method of FIG. 14A may be performed by an apparatus that includes one or more of the PDCP entities depicted in the examples of FIGS. 3-8 discussed above.

As illustrated in the example of FIG. 14A, the method may include, at 1140, receiving, at a dedicated coding or $2^{nd}$ PDCP entity, one or more original PDCP PDUs from an original or $1^{st}$ PDCP entity for a RB (e.g., DRB or SLRB). In an embodiment, the original or $1^{st}$ PDCP entity is configured to carry one or more original PDCP PDUs. The example method depicted in FIG. 14A may also include, at 1142, coding, at the coding or $2^{nd}$ PDCP entity, the original PDCP PDUs to produce one or more network coded PDCP PDUs. According to an embodiment, the method of FIG. 14A may include, at 1144, transmitting the network coded PDCP PDUs to the original or $1^{st}$ PDCP entity.

According to an embodiment, when a plurality of coding methods (e.g., XOR or Reed-Solomon method) are used to code the network coded PDCP PDUs, a separate coding or $2^{nd}$ PDCP entity is provided for each of the coding methods used.

In one embodiment, the original PDCP PDUs may be prioritized over the network coded PDCP PDUs in scheduling at the MAC layer, or the network coded PDCP PDUs are dropped entirely at the MAC layer.

According to certain embodiments, the coding or $2^{nd}$ PDCP entity is configured to use its own SN space for the network coded PDCP PDUs or is configured to transmit network coded PDCP PDUs without SNs.

In some embodiments, the method may include receiving, at the coding or $2^{nd}$ PDCP entity, a RX_DELIV counter and, when the counter reaches a certain threshold, removing network coded PDCP PDUs from the buffer of the $2^{nd}$ PDCP entity.

According to certain embodiments, the network coded PDCP PDUs may carry at least one SN of an original PDCP PDU used to code the network coded PDCP PDUs, and another SN of the original PDCP PDU may be derived by the following formula:

$$PDU\_coded = PDU\_original(SN) + PDU\_original(SN + const1),$$

where the SN is carried in the coded PDU, and const1 is a first constant.

In some embodiments, the method may also include linking original PDCP PDUs to network coded PDCP PDUs by a formula configured to derive the SN of the original PDCP PDU from the SN of the network coded PDCP PDU. For example, the formula may allow for introduction of a SN offset between the original PDCP PDU and the network coded PDCP PDU. In an embodiment, the linking of an original PDCP SN with a network coded PDCP SN for the $1^{st}$ PDCP entity and the $2^{nd}$ PDCP entity such that the SN for the network coded PDCP PDUs may be given by the following formula:

$$SN(1)_{PDCP1} = SN_{PDCP2} * n - const(1),\ SN(2)_{PDCP1} = SN_{PDCP2} * n - const(2),$$
$$\ldots,\ SN(n)_{PDCP1} = SN_{PDCP2} * n - const(n),$$

where n is the number of original PDCP PDUs used to create a network coded PDCP PDU, and const(n) is a constant.

According to an embodiment, the method may also include, when there is an error is detected in receipt of an original PDCP PDU, using the SN of the original PDCP PDU and the linking formula above to determine which original PDCP PDU(s) and network coded PDCP PDU(s) to use to reconstruct the missing original PDCP PDU.

FIG. 14B illustrates an example flow chart of a method for network coding of packets using a single DRB/PDCP entity, according to one embodiment. In certain example embodiments, the flow diagram of FIG. 14B may be performed by a network entity or network node in a communications system, such as LTE or 5G NR. In some example embodiments, the network entity performing the method of FIG. 14B may include or be included in a base station, access node, node B, eNB, gNB, NG RAN node, or the like. In other example embodiments, the network entity performing the method of FIG. 14B may include or be included in a UE, SL UE, relay UE, mobile station, mobile device, IoT device or sensor, or the like. For instance, in one example embodiment, the method of FIG. 14B may be performed by an apparatus that includes one or more of the PDCP entities depicted in the examples of FIGS. 3-8 discussed above.

As illustrated in the example of FIG. 14B, the method may include, at 1150, buffering, by a transmitting side of a DRB or PDCP entity, original PDCP PDUs. The method may also include, at 1152, coding the original PDCP PDUs at the transmitting side to produce network coded PDCP PDUs. In some embodiments, the method may include demultiplexing the original PDCP PDUs and network coded PDCP PDUs at a receiving side of the DRB or PDCP entity. According to certain embodiments, the method may then include repairing original PDCP PDUs and filtering out the network coded PDCP PDUs.

According to an embodiment, the method may include linking the original PDCP PDUs to network coded PDCP PDUs by a formula configured to derive the SN of the original PDCP PDU from the SN of the network coded PDCP PDU. For example, in this embodiment, the SN of an original PDCP PDU may be derived by the following formula:

$$SN_{original}(1) = SN_{coded} - const(1),\ \text{and}\ SN_{original}(2) = SN_{coded} - const(2),$$

where coded SNs are those SNs for which (SN+const(3)) modulo 3=0.

In some embodiments, the method may include delivering the original PDCP PDUs to higher layers even when network coded PDCP PDUs expected to arrive earlier have not yet arrived. According to one example embodiment, the method may also include including information in the header of the network coded PDCP PDUs that causes a UE, e.g., a legacy UE, to ignore the network coded PDCP PDUs.

Figures 15A, 15B:
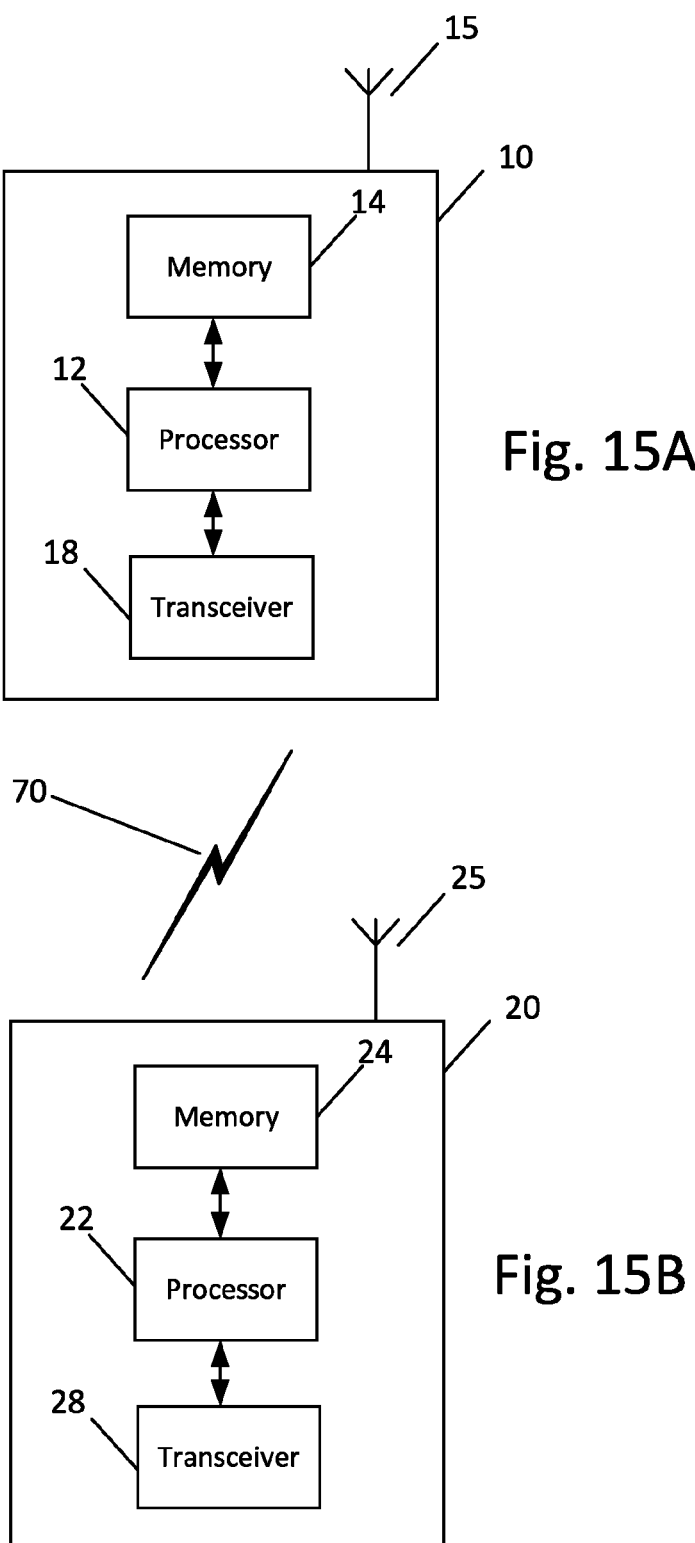
FIG. 15A illustrates an example block diagram of an apparatus, according to an embodiment.
FIG. 15B illustrates an example block diagram of an apparatus, according to an embodiment.

FIG. 15A illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 15A.

As illustrated in the example of FIG. 15A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 15A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as some operations associated with or described with respect to any of the dual DRB/PDCP entity or single DRB/PDCP entity, depicted in FIGS. 3-8. In particular, according to an embodiment, apparatus 10 may be controlled to perform a process relating to network coding using a dual DRB/PDCP entity or single DRB/PDCP entity. For instance, apparatus 10 may be controlled by memory 14 and processor 12 to perform at least the method of FIG. 14A or any other method described herein.

FIG. 15B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 15B.

As illustrated in the example of FIG. 15B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 15B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, SL UE, relay UE, mobile device, mobile station, ME, IoT device and/or NB-IoT device, for example. In an embodiment, apparatus 20 may be controlled to perform a process relating to network coding using a dual DRB/PDCP entity or single DRB/PDCP entity. According to certain embodiments, apparatus 20 may be controlled by memory 24 and processor 22 to perform the functions associated with any of the embodiments described herein, such as one or more of the operations illustrated in, or described with respect to, FIG. 14B or any other method described herein.

In some embodiments, an apparatus (e.g., apparatus 10 and/or apparatus 20) may include means for performing a method or any of the variants discussed herein, such as the methods described with reference to FIGS. 14A and 14B. Examples of the means may include one or more processors, memory, and/or computer program code for causing the performance of the operation.

In view of the foregoing, certain example embodiments provide several technological improvements, enhancements, and/or advantages over existing technological processes and constitute an improvement at least to the technological field of wireless network control and management. For example, as discussed in detail in the foregoing, certain example embodiments provide systems and methods that provide an architecture required for coding (or any quick acknowledgment schemes) within the PDCP sub layer. In one example embodiment, the architecture may be implemented with a specific dual PDCP entity, where original and coded (or duplicate) packets use separate PDCP entities. According to certain embodiments, if multiple coding methods are used (such as XOR and Reed-Solomon), then it is also possible to have a separate PDCP entity for each of the coding methods used. In addition, example embodiments provide examples of the signaling between the PDCP entities. According to a further embodiment, a single DRB/PDCP entity may be provided and that is configured to carry both original PDCP PDUs and network coded PDCP PDUs. In some embodiments, the PDCP entity delivery functionality may be modified to skip or remove network coded (or duplicate) PDUs in delivery. Furthermore, in certain example embodiments, information may be added into the PDU header that causes a legacy UE to ignore a network coded or duplicate PDU. In an example embodiment, a receiver RX_DELIV pointer or counter is provided and when this counter has advanced to a certain threshold, the corresponding network coded PDUs may be removed from the buffer. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:
   a first packet data convergence protocol (PDCP) entity for a radio bearer, the first packet data convergence protocol (PDCP) entity configured to carry one or more original packet data convergence protocol (PDCP) protocol data units (PDUs); and
   a second packet data convergence protocol (PDCP) entity for the radio bearer, the second packet data convergence protocol (PDCP) entity configured to carry one or more network coded packet data convergence protocol (PDCP) protocol data units (PDUs);
   wherein the second packet data convergence protocol (PDCP) entity is configured to
   receive one or more original packet data convergence protocol (PDCP) protocol data units (PDUs) from the first PDCP entity for a radio bearer, code the original packet data convergence protocol (PDCP) protocol data units (PDUs) to produce one or more network coded packet data convergence protocol (PDCP) protocol data units (PDUs), and transmit the network coded packet data convergence protocol (PDCP) protocol data units (PDUs) to the first packet data convergence protocol (PDCP) entity.

2. The apparatus according to claim 1, wherein the second packet data convergence protocol (PDCP) entity is configured to use its own sequence number (SN) space for the network coded packet data convergence protocol (PDCP) protocol data units (PDUs) or is configured to transmit network coded packet data convergence protocol (PDCP) protocol data units (PDUs) without sequence numbers (SNs).

3. The apparatus according to claim 1, wherein, when a plurality of coding methods are used to code the network coded packet data convergence protocol (PDCP) protocol data units (PDUs), the apparatus comprises a separate second packet data convergence protocol (PDCP) entity for each of the coding methods used.

4. The apparatus according to claim 1, wherein the original packet data convergence protocol (PDCP) protocol data units (PDUs) are prioritized over the network coded packet data convergence protocol (PDCP) protocol data units (PDUs) in scheduling at the medium access control (MAC) layer, or the network coded packet data convergence protocol (PDCP) protocol data units (PDUs) are dropped entirely at the medium access control (MAC) layer.

5. The apparatus according to claim 1, wherein the network coded packet data convergence protocol (PDCP) protocol data units (PDUs) carry at least one sequence number (SN1) of an original packet data convergence protocol (PDCP) protocol data unit (PDU) used to code the network coded packet data convergence protocol (PDCP) protocol data units (PDUs).

6. The apparatus according to claim 5, wherein another sequence number (SN2) of the original packet data convergence protocol (PDCP) protocol data units (PDU) is derived by the following formula:

$$SN2 = SN1 + const1,$$

where the sequence numbers SN1 and SN2 are carried in the network coded packet data convergence protocol (PDCP) protocol data units (PDUs) header, and const1 represents a first constant.

7. The apparatus according to claim 1, wherein the second packet data convergence protocol (PDCP) entity is configured to:

link original packet data convergence protocol (PDCP) protocol data units (PDUs) to network coded packet data convergence protocol (PDCP) protocol data units (PDUs) by a formula configured to derive the sequence number (SN) of the original packet data convergence protocol (PDCP) protocol data units (PDU) from the sequence number (SN) of the network coded packet data convergence protocol (PDCP) protocol data unit (PDU), such that the sequence number (SN) for the network coded packet data convergence protocol (PDCP) protocol data units (PDUs) is given by the following linking formula:

$$SN(1)_{PDCP1} = SN_{PDCP2} * n - const(1), \quad SN(2)_{PDCP1} = SN_{PDCP2} * n - const(2),$$
$$\ldots, SN(n)_{PDCP1} = SN_{PDCP2} * n - const(n),$$

where n is the number of original packet data convergence protocol (PDCP) protocol data units (PDUs) used to create a network coded packet data convergence protocol (PDCP) protocol data unit (PDU), and const (n) represents a constant.

8. The apparatus according to claim 7, wherein the second packet data convergence protocol (PDCP) entity is configured to:

when an error is detected in receipt of an original packet data convergence protocol (PDCP) protocol data unit (PDU), using the sequence number (SN) of the original packet data convergence protocol (PDCP) protocol data unit (PDU) and the linking formula to determine which original packet data convergence protocol (PDCP) protocol data units (PDUs) and network coded packet data convergence protocol (PDCP) protocol data units (PDUs) to use to reconstruct the missing original packet data convergence protocol (PDCP) protocol data unit (PDU).

9. The apparatus according to claim 1, wherein the apparatus comprises at least one of a base station, gNB, user equipment, sidelink user equipment, or vehicle-to-everything device.

10. An apparatus, comprising:

a data radio bearer (DRB) or packet data convergence protocol (PDCP) entity comprising a transmitting side and a receiving side, wherein the transmitting side is configured to
buffer original packet data convergence protocol (PDCP) protocol data units (PDUs); and
code the original packet data convergence protocol (PDCP) protocol data units (PDUs) to produce network coded packet data convergence protocol (PDCP) protocol data units (PDUs), wherein the data radio bearer (DRB) or packet data convergence protocol (PDCP) entity is configured to:
link the original packet data convergence protocol (PDCP) protocol data units (PDUs) to network coded packet data convergence protocol (PDCP) protocol data units (PDUs) by a formula configured to derive the sequence number (SN) of the original packet data convergence protocol (PDCP) protocol data unit (PDU) from the sequence number (SN) of the network coded packet data convergence protocol (PDCP) protocol data unit (PDU), and wherein the sequence number (SN) of an original packet data convergence protocol (PDCP) protocol data unit (PDU) is derived by the following formula:

$$SN_{original}(1) = SN_{coded} - const(1), \text{ and } SN_{original}(2) = SN_{coded} - const(2),$$

where coded sequence numbers (SNs) are those sequence numbers (SNs) for which (SN+const(3)) modulo 3=0.

11. The apparatus according to claim 10, wherein the coded packet data convergence protocol (PDCP) protocol data units (PDUs) are given a sequence number (SN).

12. The apparatus according to claim 10, wherein the coded packet data convergence protocol (PDCP) protocol data units (PDUs) are not given a sequence number (SN).

13. The apparatus according to claim 10, wherein the receiving side of the data radio bearer (DRB) or packet data convergence protocol (PDCP) entity is configured to:

demultiplex the original packet data convergence protocol (PDCP) protocol data units (PDUs) and network coded packet data convergence protocol (PDCP) protocol data units (PDUs).

14. The apparatus according to claim 13, wherein the receiving side of the data radio bearer (DRB) or packet data convergence protocol (PDCP) entity is configured to:

repair original packet data convergence protocol (PDCP) protocol data units (PDUs) and filter out the network coded packet data convergence protocol (PDCP) protocol data units (PDUs).

15. The apparatus according to claim 10, wherein the network coded packet data convergence protocol (PDCP) protocol data units (PDUs) carry at least one sequence number (SN1) of an original packet data convergence protocol (PDCP) protocol data unit (PDU) used to code the network coded packet data convergence protocol (PDCP) protocol data units (PDUs).

* * * * *